April 24, 1928. 1,667,304
E. W. BOWEN
MANUFACTURE OF FUEL BRIQUETTES
Filed Sept. 27, 1927
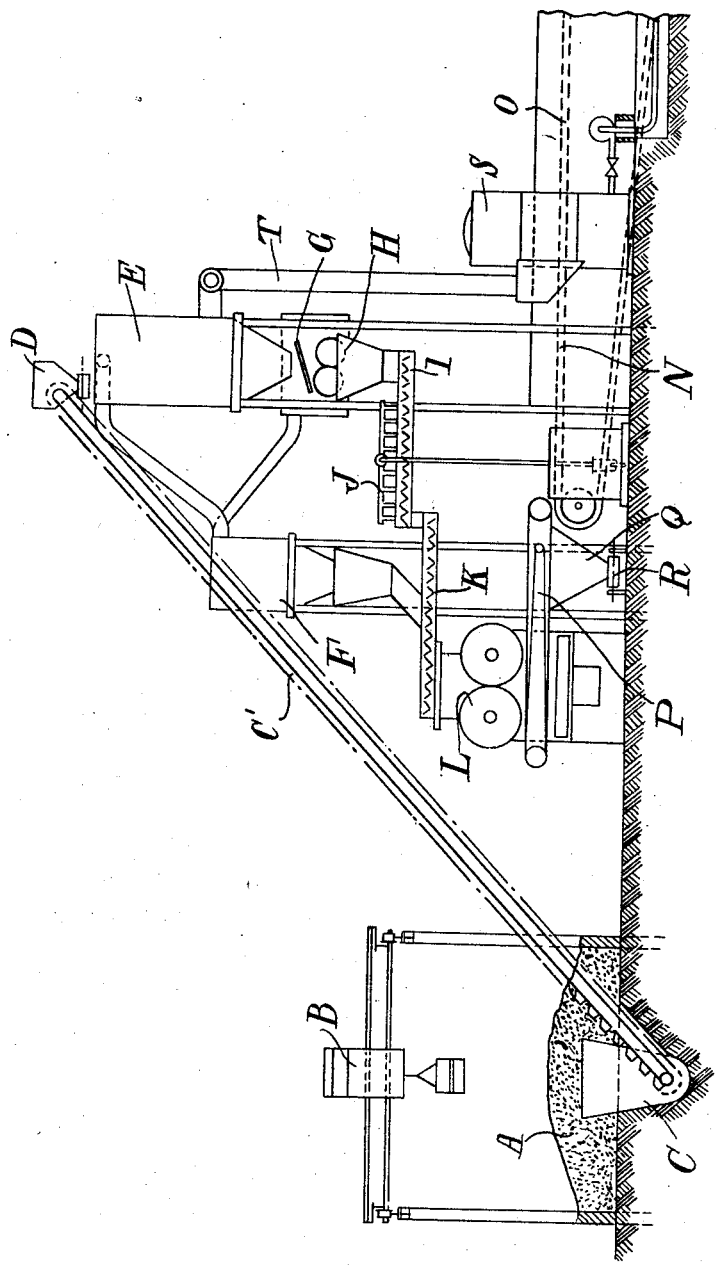
Inventor
E. W. Bowen
By Watson E. Coleman, Atty Patented Apr. 24, 1928.

1,667,304

UNITED STATES PATENT OFFICE.

ERNEST WINDSOR BOWEN, OF LONDON, ENGLAND.

MANUFACTURE OF FUEL BRIQUETTES.

Application filed September 27, 1927, Serial No. 222,322, and in Great Britain September 30, 1926.

This invention relates to the manufacture of fuel briquettes from anthracite or other coal or coke or from a mixture containing one or more of these materials which are mixed in a suitably fine state of division with a binder consisting of waste sulphite liquor obtainable from wood-pulp mills, then moulded and subsequently baked.

In producing briquettes by such processes already known considerable difficulty is experienced in obtaining with consistency a final product which is impervious to moisture, capable of resisting impact and of good burning quality, owing in a large measure to proportions of granular material and coal dust or flour in the mass being readily subject to variation.

The primary object of the present invention is to render possible the production of a briquetted material which shall possess with consistency good burning qualities, impermeability to moisture and considerable mechanical strength.

With this end in view my invention consists broadly in separating the fine dust or flour from the granular portion of the fuel while dry and in re-introducing said dust or flour in definite proportion into the granular material after the latter has been mixed with the binder. The presence of this dust or flour in a definite proportion is found to have advantageous effect in filling the interstices between the granular parts of the mass and at the same time renders the quality of the product uniform not withstanding variations of origin of the raw materials.

In one way of carrying the invention into practical effect anthracite duff is first dried and screened through a screen having six to eight meshes to the inch so as to remove all material larger than $\frac{1}{6}$ or $\frac{1}{8}$ of an inch which may if desired be broken and returned to the screen or if preferred reserved for sale as peas and beans.

The screened material contains a substantial proportion of fine dust or flour which must be separated from the granular portion and set aside for subsequent use. This separation may be effected by a cyclone extractor which may act upon the material as it passes through the drier. The coal drier may or may not be combined with the screen as desired.

The anthracite duff after removal of the flour usually contains granular material of the following grades in the following proportions:—

| | Per cent. |
|---|---|
| 8 mesh granules | 60 |
| 20 mesh granules | 12 |
| 30 mesh granules | 7 |
| 40 mesh granules | 6 |
| 50 mesh granules | 15 |

The quantity of flour in the duff before treatment varies widely and it has been found that this variation was largely responsible for the difficulties experienced in producing briquetted material of consistent quality.

Now according to the improved process the dried granular anthracite after removal of the flour is mixed with sulphite liquor at about 28° Baumé and 150° Fahrenheit in a suitable machine which ensures a thorough distribution of the liquor throughout the granular material, suitable proportions being 86% by weight of granular material to 9% of sulphite liquor. After these constituents have been properly mixed approximately 5% dust or flour is added and the mixing operation repeated until the mass becomes truly plastic whereupon it may be conveyed to the feed hopper of the briquetting press. When moulded the briquettes are baked at a temperature of about 630° Fahrenheit for approximately 22 minutes and then cooled.

Briquettes so made are found to be capable of resisting pressure up to 500 lbs. after baking and even after immersion in water for twenty minutes will resist 300 lbs. pressure. Furthermore such briquettes ignite as readily as ordinary coal and are smokeless in combustion.

The accompanying drawing illustrates diagrammatically a plant arranged for carrying out the process herein described.

In the arrangement shown the material to be briquetted is fed from a dump A by suitable means such as a travelling crane or overhead gantry B to a hopper C whence it is raised by an endless chain conveyor C' to a hopper D arranged above the drier E. This drier may conveniently be heated by products of combustion from a boiler S passing up a pipe T and by creating within the drier chamber an upwardly moving centrifugal draught the dust or flour may be separated and removed to a bin F whilst the heavier granular material passes from the bottom of the drier E to an inclined screen of approximately 8 meshes to the inch which may have a magnetic separator combined therewith for removing any pieces of iron. The sifted granular material passes from the screen to a simple roller crusher H and any newly created dust or flour is removed and conveyed to the bin F whilst the granular material enters a screw conveyer I whose rotor is best operated at a high speed so that the rate of feed is approximately 2 lbs. of fuel per second past any given point for a plant working at an output of approximately 3 tons per hour. During its passage through this screw conveyor the fuel is moistened with sulphite liquor of the required density and temperature said liquor being introduced by a series of nozzles J arranged above the conveyor I. From the conveyor I the moistened mass passes to a second screw conveyor K and during its passage through this latter the requisite proportion of dust or flour from the bin F is introduced and the whole mass when thoroughly intermixed becomes relatively plastic and non-tacky and is thus in a suitable condition for moulding. On leaving the screw conveyor K the plastic mass is fed to a moulding press L whose rollers consolidate the material and shape it into briquettes which are delivered on to a conveyor band M of open mesh for transit to the conveyor N of the drying furnace O. The open mesh of the conveyor band M is such as to allow broken or damaged briquettes to fall through on to a lower conveyor band P which removes this material to a collecting hopper whence it may be returned by a conveyor R to a suitable point in the machine for re-handling.

The boiler S previously mentioned may provide steam for raising the temperature of the sulphite liquor, for operating steam jets for cleaning purposes and for other uses and may conveniently be gas fired, the gas being obtained from a producer plant consuming the briquettes made in accordance with this process. Similarly the gas so made may be employed in heating the briquette drying furnace.

I claim:

1. A method of the kind set forth for the manufacture of fuel briquettes characterized by the separation of the fine dust or flour from the granular portion of the fuel while dry, and the re-introduction of a definite proportion of said dust or flour into the granular material after the latter has been mixed with the binder.

2. A method for the manufacture of fuel briquetttes according to claim 1, characterized in that the material to be briquetted is first dried in a chamber wherein a centrifugal draught is maintained acting to separate the dust or flour from the granular material.

3. A method for the manufacture of fuel briquettes according to claim 1, characterized in that the separated granular material during its passage through a screw conveyor is first moistened with sulphite liquor and later subjected to the addition of a definite proportion of fuel dust or flour.

In testimony whereof he has affixed his signature.

ERNEST WINDSOR BOWEN.